March 13, 1934.                V. L. DAVIS                1,950,598
POWER TRANSMISSION DEVICE
Filed Dec. 28, 1932          2 Sheets-Sheet 1
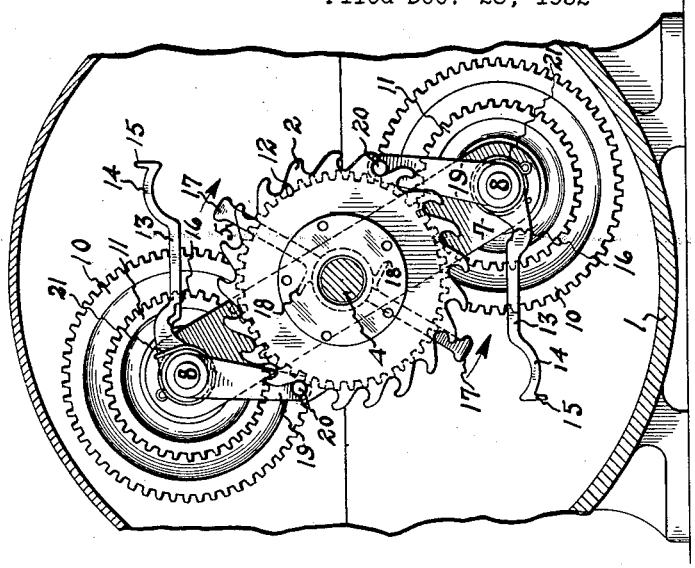
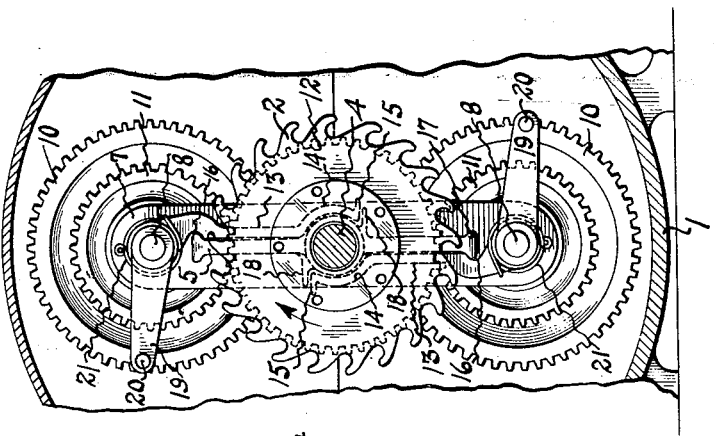
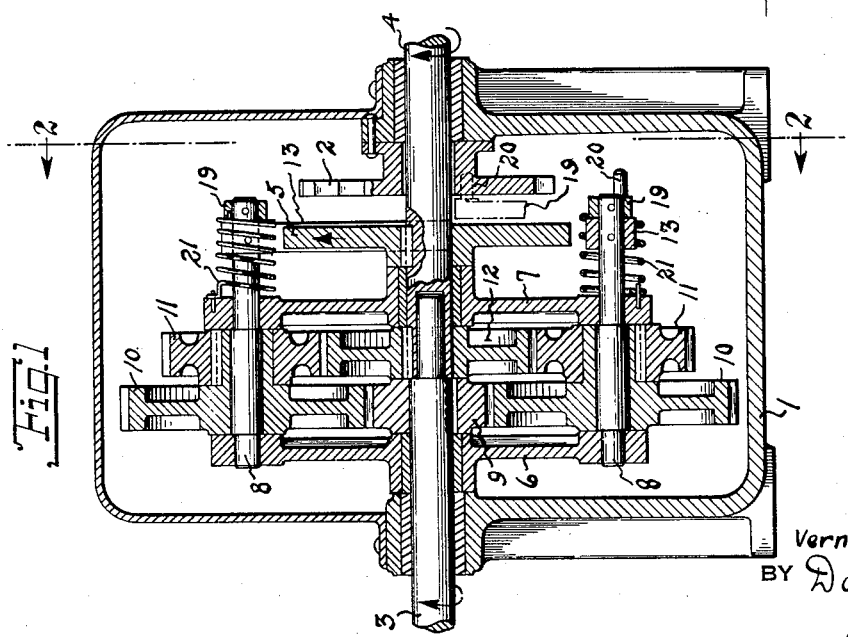
INVENTOR
*Vernon L. Davis*
BY *Danby & Danby*
ATTORNEYS.

March 13, 1934. V. L. DAVIS 1,950,598
POWER TRANSMISSION DEVICE
Filed Dec. 28, 1932   2 Sheets-Sheet 2
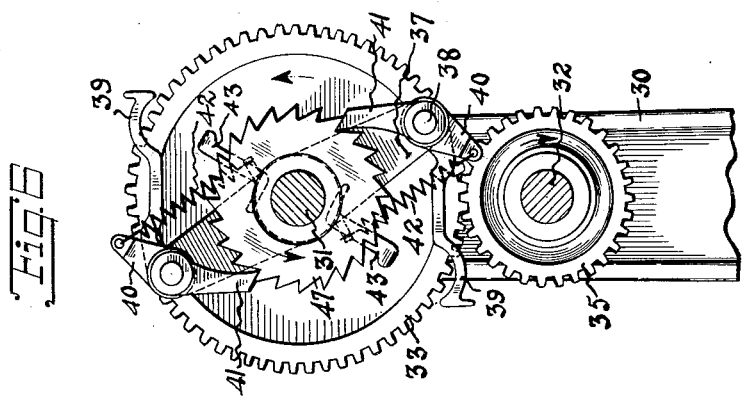
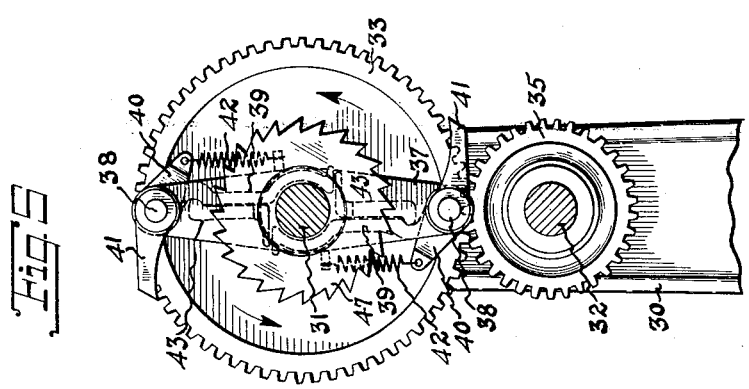
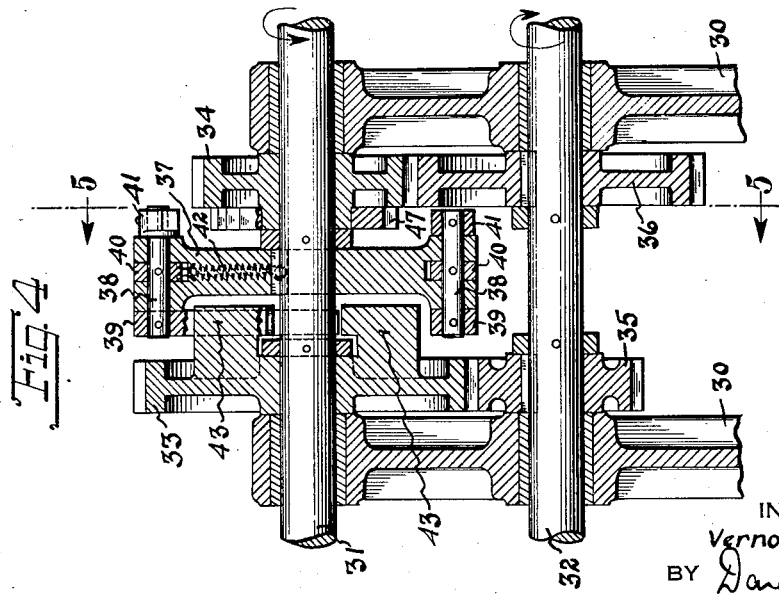
INVENTOR
Vernon L. Davis
BY Danby & Danby
ATTORNEYS.

Patented Mar. 13, 1934

1,950,598

UNITED STATES PATENT OFFICE 1,950,598

POWER TRANSMISSION DEVICE

Vernon L. Davis, Blue Point, N. Y.

Application December 28, 1932, Serial No. 649,160

4 Claims. (Cl. 74—34)

This invention relates to improvements in power transmission devices of a type which automatically changes the gear ratios when the load on the driven shaft exceeds a predetermined amount.

The general object of this invention is to provide, in simplified form, a power transmission device in which the variation in the load on the driven shaft automatically effects a change in the gear ratios when the torsional resistance of the load exceeds a predetermined value.

These and many other objects as will appear from the following disclosure are secured by means of this invention.

This invention resides substantially in the combination, construction, arrangement and relative location of parts all as will be described in greater detail hereinafter.

Referring to the drawings

Figure 1 is a vertical longitudinal central cross-sectional view through the gear mechanism of this invention;

Fig. 2 is a cross-sectional view taken on the line 2—2 of Fig. 1 with some parts of the casing broken away;

Fig. 3 is a view similar to that of Fig. 2 showing the parts in operated position to effect a speed reduction from that obtained with the parts in the position shown in Fig. 2;

Fig. 4 is a vertical longitudinal central cross-sectional view through a modified form of device embodying the principles of this invention;

Fig. 5 is a cross-sectional view taken on the line 5—5 of Fig. 4; and

Fig. 6 is a similar view with the parts in operated position after they have operated to effect a speed reduction.

The present invention is basically distinguished from similar power transmission gear mechanism in which speed changes are effected by means of a manually operated lever in that the variations in the load itself automatically effects a change in the gear ratios. Thus with the mechanism as illustrated in the drawings when the parts are in the position as shown in Fig. 2 a direct drive is effected from the driving shaft 3 to the driven shaft 4. When the load resistance on the driven shaft 4 exceeds a predetermined value the parts shift as illustrated in Fig. 3, so that the power is transmitted from the driving shaft to the driven shaft in a speed ratio predetermined by the gear ratios which, having previously been locked, are freed for relative movement with respect to each other.

Referring to the drawings in detail a suitable casing has been illustrated at 1 in which are journaled the longitudinally aligned shafts 3 and 4. The inner ends of these shafts are nested as illustrated in the drawings in accordance with usual practice and are free for relative movement with respect to each other. At 2 is a rigid wheel fixed to the casing 1 so as to be immovable. Keyed to the shaft 4 is an arm 5, and journaled on the two shafts so as to be movable thereon are the arms or plates 6 and 7. Mounted in automatically opposed relation on the outer ends of these arms are the shafts 8 which may turn in the arms 6 and 7 and which project beyond the plate 7 as illustrated in Fig. 1.

Keyed to shaft 3 is a driving gear 9 which meshes with the gears 10 which are freely mounted on the shafts 8 so as to be rotatable thereon. Keyed to the gears 10 or otherwise secured thereto for rotation therewith are the gears 11 which, in turn, mesh with a gear 12 keyed to the shaft 4 for rotation therewith. Secured by means of pins to the shafts 8 are the arms 13, the free ends of which are arcuate in form as indicated at 14 and terminate in projections or lugs 15. Near their inner ends these arms are provided with offset portions 16 in which the ends 17 of the arm 5 rest. The ends of the arms as indicated at 17 are enlarged to provide shoulders at each side. When the parts are in the position shown in Fig. 2 the ends 17 of arm 5 rest in the recesses 16 of the arms 13 which are positioned so that their curved ends are concentric with the driven shaft. The arms 13 are provided with lugs 15 which are positioned so as to contact with the lugs 18 on the arm 5.

Also secured to the shafts 8 by means of pins are the levers 19 which are provided with pins 20 positioned so as to be engageable with the teeth of the toothed wheel 2. At 21 are springs which have one end anchored to the plate 7 and the other end encircling the arms 13 so as to urge them into the position shown in Fig. 2.

In the operation of this device when power is applied to shaft 3 to give it clockwise direction, when viewed from the righthand end (Figs. 2 and 3), this power will be transmitted through the gear assembly including the plates 6 and 7 to the arms 13. Power will then be transmitted to shaft 4 by reason of the contact of arms 13 with arms 5. It will be remembered that the arms 5 consist of a single pair which is keyed to the shaft 4. The parallel relationship between the arms 13 and 5 will effect this transmission of power. However, the resistance of the driven shaft to rotation, which will vary with the load, will cause a reactive force to be applied to the arms 13 which force, if sufficient, will cause arms 13 to rotate in a counter-clockwise direction against the resistance of springs 21. This movement of arms 13 will cause a conjoint movement of arms 19 which are pinned to the shafts 8 so that they will move down to a position where the pins 20 on the ends thereof engage the teeth of the wheel 2. The plates 6 and 7 and the parts mounted thereon will then be prevented from further rotation about the axis of shafts 3 and 4 because of the engagement of the pins 20 with the ratchet wheel. Power will then be transmitted through shaft 3 and gear 9 to gears 10. The rotation of gears 10 will cause rotation of gears 11 and, in turn, the rotation of gears 12 and the driven shaft 4. The speed of rotation of shaft 4 will not now be in a one to one ratio with the driving shaft 1 but in a ratio depending upon the gear ratios of the gears 9, 10, 11 and 12.

As soon as the load on shaft 4 decreases to a point where springs 21 may return the arms 13 to their normal position the gears will again become locked and a direct drive will result.

The springs 21 need not be as heavy as might appear because of the fact that the arms 13 and 5 lie parallel and the enlarged ends of arm 5 contact the arms 13 in the socket 16 at a point near the pivot point of the arms. The lugs 15 contact with the lugs 18 when shaft 3 is rotated in a direction opposite to that indicated by the arrow in Fig. 1 so as to lock the parts to insure a direct drive of shaft 4 in the opposite direction.

It should be noted that arms 13 and 19 instead of being locked to shaft 8 may be made in a single piece in the form of a bell crank lever and be freely mounted on the shaft 8 so as to rotate thereon when the load overcomes the resistance of springs 21.

In the modified arrangement of Figs. 4, 5 and 6 the driving shaft 31 and the driven shaft 32 are in spaced parallel relation and are journaled for rotation in the supporting standards 30. The gears 33 and 34 are loosely mounted on the shaft 31 for rotation thereon and mesh respectively with the gears 35 and 36 which are keyed to the shaft 32 for rotation therewith. At 37 is an arm keyed to the shaft 31 and provided at its outer ends with the short shafts 38. The ends of arm 37 are bifurcated and short arms 40 are mounted therein and pinned to the shafts 38. To the lefthand ends of shafts 38 are pinned the arms 39 which correspond to arms 13 of the previously described form of device. The righthand ends of shafts 38 have the arms or portions 41 keyed thereto. The righthand face of gear 33 is provided with the projections 43 which are positioned to lie parallel to the arms 39, as illustrated in Fig. 5, and are provided with right-angled ends which cooperate with the lugged ends of arms 39 as previously described. The upper ends of the projections extend laterally into recesses or sockets in the arms 39 as before. The ends of arms 40 are connected to lugs on the sides of the arm 37 by means of springs 42 to hold the arms 41 and 39 normally in the position shown in Fig. 2. Secured to the gear 34 on the lefthand face thereof is the ratchet wheel 47 positioned to be engaged by the pawls 41.

When power is applied to shaft 31 to cause counter-clockwise rotation thereof, when viewed from the righthand end, gear 33 is driven because of the contact between arms 39 and 43. The rotation of gear 33 causes gear 35 and shaft 32 to revolve but, in this case, at different speeds. When the resistance to rotation of shaft 32 is sufficient arms 39 swing outwardly against the resistance of springs 42 until the ends of the pawls 42 engage with the ratchet wheel 47. At this time gear 33, which has previously been locked to shaft 31, will be freed and gear 34 will be locked thereto. As a result shaft 32 will be revolved by means of gears 34 and 36 but this time at a different relative speed with respect to shaft 31.

When the load on shaft 32 falls so that springs 42 move the pawls out of engagement with ratchet wheel 47 the parts will return from the position shown in Fig. 6 to the position shown in Fig. 5 releasing the gear 34 and locking gear 33 to shaft 31. For a reverse direction of rotation the lugs on the projections 43 and the arms 39 will engage to hold gear 33 locked to shaft 31 to effect reverse rotation of shaft 32.

As will be apparent to those skilled in the art the device of this invention may be employed wherever it is desired to transmit power to a variable load. For example, if a handle is applied to the driving shaft in either form of device and the structure proportioned and made a part of a fishing reel it will be apparent that as the shaft 31 is revolved by the handle if the resistance offered by the fish as he is drawn in is small the gear ratio for the first form of device will be one to one and in the second form of the device in the ratio of the gears 33 and 35. As the fish, however, resists being pulled in the device will automatically shift gears to give a speed reduction as between the driving shaft and the driven shaft so that he may be handled more easily and pulled in more slowly.

The device, of course, is not limited for use in fish reels since it can be used on any mechanism where it is desired to automatically change the gear ratio as the load varies.

From the above description it will be apparent to those skilled in the art that the principles of this invention and the physical embodiments thereof may assume other forms without departure from the scope of the invention and I do not, therefore, desire to be strictly limited to the disclosure as given for purposes of illustration but rather to the scope of the appended claims.

What I seek to secure by United States Letters Patent is:

1. A power transmission device comprising aligned driving and driven shafts, a gear secured to each shaft, a cage freely rotatable on the axis of said shafts, two pairs of gears journaled in each cage, each pair interconnecting the gears on said shafts, a radially extending arm secured to one of said shafts, a pair of arms pivotally mounted on said cage, resilient means for causing the arms to engage said radially extending arms and a fixed member engageable by said arms upon pivotal movement against said resilient means.

2. A power transmission device comprising aligned driving and driven shafts, a gear secured to each shaft, a cage freely rotatable on the axis of said shafts, two pairs of gears journaled in said cage, each pair interconnecting the gears on said shafts, a radially extending arm secured to one of said shafts, a pair of bell crank arms pivotally mounted on the cage, resilient means for holding the bell crank arms in engagement with the radially extending arm and fixed means engageable by the bell crank arms when moved by the reaction of the radially extending arm to prevent rotation of the cage.

3. A power transmission device comprising aligned driving and driven shafts, a gear secured to each shaft, a cage freely rotatable on the axis of said shafts, two pairs of gears journaled in said cage, each pair interconnecting the gears on said shafts, a radially extending arm secured to one of said shafts, a pair of bell crank arms pivotally mounted on the cage, resilient means for holding the bell crank arms in engagement with the radially extending arm and fixed means engageable by the bell crank arms when moved by the reaction of the radially extending arms to prevent rotation of the cage, one arm of each of the bell crank levers normally lying parallel to the radially extending arms and having recesses at their inner pivoted ends, the radially extending arms having enlarged ends resting in the recesses.

4. A power transmission device comprising aligned driving and driven shafts, a gear secured to each shaft, a cage freely rotatable on the axis of said shafts two pairs of gears journaled in said cage, each pair interconnecting the gears on said shafts, a radially extending arm secured to one of said shafts, a pair of bell crank arms pivotally mounted on the cage, resilient means for holding the bell crank arms in engagement with the radially extending arm and fixed means engageable by the bell crank arms when moved by the reaction of the radially extending arm to prevent rotation of the cage, one arm of each of the bell crank levers normally lying parallel to the radially extending arms and having recesses at their inner pivoted ends, the radially extending arms having enlarged ends resting in the recesses, the free ends of these arms of the bell crank levers normally engaging projections at the bases of the radially extending arms.

VERNON L. DAVIS.